United States Patent Office 2,777,798
Patented Jan. 15, 1957

2,777,798
STABLE FAT-SOLUBLE VITAMIN-CONTAINING COMPOSITION

Melvin Hochberg, North Arlington, and Melvin J. MacMillan, Cranford, N. J., assignors to Nopco Chemical Company, Harrison, N. J., a corporation of New Jersey No Drawing. Application February 19, 1953, Serial No. 337,876

18 Claims. (Cl. 167—81)

This invention relates to novel compositions of matter and to methods for preparing them. More particularly the invention is directed to novel and highly useful compositions of matter containing certain fat-soluble vitamins, namely vitamin A and/or vitamin D, and also to methods for preparing them. In one of its more specific aspects, the invention is directed to novel compositions of matter containing either or both of said particular vitamins, with said novel compositions being of particular size range and with said vitamins being highly stable therein and being readily available or digestible.

Stock and poultry feeds as well as human feeds have been fortified with said vitamins for many years, but such feeds have been subject to considerable loss of nutritive value especially with regard to vitamin A, because vitamin A is unstable due to the oxidizing influences of the atmosphere and because both vitamins A and D are unstable to the influence of components of certain feeds with which they are to be mixed. In the prior art proposals, a number and varied attempts have been made to protect said vitamins but none of the proposed products has been entirely satisfactory, either because of the unstable nature of the products or the biological unavailability of the vitamin A therein, or the indigestibility of the products for the vitamin A content thereof, or for one or more of various other reasons known to those well versed in the art.

It is the object of this invention to provide new and improved dry carriers for fat-soluble vitamins.

A further object of this invention is to provide fat-soluble vitamin-containing products in a dry form which are highly resistant to oxidative deterioration.

Still another object of this invention is to provide a composition of matter containing vitamin A or D in such a manner as to be highly stable and readily available, i. e. readily digestible.

An additional object of the invention is to provide dry carriers for fat-soluble vitamins which when admixed with stock and poultry feeds or with human foods will fortify such materials with fat-soluble vitamins in such a manner that these materials will retain their fat-soluble vitamin potency for longer periods of time even when the fortified products are stored under conditions conducive to oxidative deterioration of the fat-soluble vitamins.

Other objects of the invention will in part be obvious and will in part appear hereinafter.

It has now been discovered that the above and other objects of the invention may be accomplished by providing a dry, free-flowing product made up of a multiplicity of very small spheroidal particles, each particle comprising an intimate admixture of a fat-soluble vitamin material, an edible antioxidant, an edible surface-active material, and a normally solid wax-like material which wax-like material has a melting point of at least about 45° C. or over. The term "spheroidal" is used herein to include not only particles which are spheroidal in shape but also particles which are truly spherical in shape and the term "wax-like material" is used herein to connote normally solid glycerides, other fatty acid esters, free fatty acids, vegetable waxes, mineral waxes, and similar materials or mixtures of such materials. In the preferred embodiment of our invention, we incorporate very finely divided vegetable materials, i. e. vegetable flours, into each of the many spheroidal particles which make up the products of the invention. We have found that the presence of a vegetable flour in the products of our invention considerably increases the stability of the vitamins in the products. However, the products of our invention which do not contain a vegetable flour have a very high degree of stability and are much superior to the prior art products. Materials such as vegetable dyes, synergists for the antioxidants, etc. may also be added to the compositions, if desired, and incorporated into each of the many spheroidal particles which make up the products of the invention.

The compositions of the invention, both the basic compositions and the preferred embodiment of the invention, contain the fat-soluble vitamins in such a manner that said vitamins are readily available and also highly resistant to oxidative destruction as is evidenced by the fact that the vitamin potency of the products of the invention is substantially undiminished even after the products have been stored for long periods of time. What is even more significant, however, is the fact that stock and poultry feeds and human foods which have been enriched with vitamins by the addition of the products of our invention thereto are extremely stable and very little loss of the added vitamin potency occurs even when these enriched products are stored for periods of from six months to a year or longer under conditions which are very conducive to oxidative destruction of the vitamins. Thus it is now possible by utilizing the products of our invention to prepare vitamin-enriched stock or poultry feeds and then ship such feeds for long distances and subsequently store them for long periods of time before they are sold to the ultimate consumer. Prior to our invention, many feeds enriched with readily available vitamin A would not retain their vitamin A potency for a practical storage period, but with our products it is possible to prepare such enriched feeds which will retain their vitamin A potency for long periods even at summer temperatures.

The loss of vitamin potency which occurs when products containing readily available fat-soluble vitamins are stored for long periods of time is commonly referred to as "oxidative" destruction of the vitamins. Actually, however, it is very likely that at least part of the loss of vitamin potency is due to destruction of the vitamins by means other than ordinary oxidation. In all probability other ingredients in the composition containing the vitamins in some manner or other catalyze the transformation of the vitamins to physiologically inactive compounds. However, it is the usual practice to refer to the sum total of any losses of vitamin potency which show up by any of the usual methods of analysis such as bioassay or chemical or physical methods of analysis as being oxidative destructions of the vitamins. We have adhered to this practice in the description of our invention.

In preparing the products of our invention, the normally solid wax-like material is melted and the fat-soluble vitamin-containing material which is to be employed is then admixed therewith along with the edible antioxidant and the edible surface-active material which are to be incorporated into the products. In the preferred embodiment of the invention, a small quantity of a vegetable flour is also thoroughly admixed with the melted wax-like material. Thereafter the liquid mixture which has thus been prepared is formed into a multiplicity of very small solid spheroidal particles by any suitable method.

Such a liquid mass contains all of said components, substantially uniformly distributed with respect to each other. While in said condition at elevated temperature, the mass, in any convenient and desired manner, is converted or formed into droplets or small globules whose temperature is reduced to convert them to the solid state or to cause solidification thereof.

There are two general methods for preparing such particles which we have found to be highly satisfactory but means other than these two methods can, of course, be used. One of the methods by which the desired spheroidal particles may be prepared involves a process which we shall refer to as a "centrifugal" process. In such a process the melted mixture of the ingredients which make up the composition, that is the mixture of the essential components of the invention is in the liquid state at elevated temperature with the components being substantially uniformly distributed throughout, is placed in or led into a rapidly rotating vessel, the sides of which contain numerous small perforations. Such perforations may be placed anywhere along the sides of the vessel. Also, either a vessel which is substantially a cylinder or a vessel which is in the shape of an inverted cone with perforations only at the top part of the sides of the cone may be used. As the vessel rapidly rotates, the melted mixture will flow out of the perforations in the side of the vessel and will be thrown for a considerable distance through the air, e. g. about 10 to 15 feet or more, due to the centrifugal force. As the melted mixture passes through the perforations in the side of the vessel, it is broken up into a multiplicity of very small spheroidal particles. These particles, which are liquid when they leave the vessel, cool very rapidly as they pass through the air, and by the time they fall to the floor of the room in which the rotating vessel is located they will have substantially solidified, and under practically all conditions it will be found that these solid particles will be practically perfect spheres. In some cases, the particles will not be true spheres but they will be so nearly so that they are properly described as being spheroidal in shape. In the other method which we prefer to employ in forming the spheroidal particles which make up the compositions of our invention, we pass the melted mixture of ingredients through a spray gun or similar spraying device. As the finely subdivided liquid particles pass through the atmosphere after being forced through the spraying device, they rapidly cool and form solid spheroidal particles just as in the case when the melted mixture of ingredients is passed through a centrifugal device of the type described above. In both of these processes the melted mixture of ingredients is preferably at a temperature such that the mixture flows readily and will flow through the perforations of the rapidly rotating vessel or through the spray device without tending to clog up the perforations of the rotating vessel or the openings in the spray device. The speed at which the centrifugal apparatus is rotated may vary, of course, but we have found that a rotation of from about 200 to about 1500 revolutions per minute will give very satisfactory products. The pressure which is used in the various types of spraying devices can vary to some extent, of course, although in all cases sufficient pressure will be required to cause the hot liquid mixture to be broken up into very small droplets. These droplets cool quite rapidly as they pass through the air, and by the time they fall to the floor of the room in which the spray device is located, they will have formed a multiplicity of small solid spheroidal particles. The spray device may conveniently be located near the ceiling of a room having a rather high ceiling or it may be located near the top of a tall tower with the nozzle of the spray device being directed downwardly. However, such an arrangement is not necessary and, if desired, one may locate the spray device on or near the floor of the room in which the spray device is placed. The nozzle of the spray device is then directed so that the initial path of the droplets will be at least parallel to the floor of the room or at an angle slightly above a line parallel with the floor of the room. Of course, in such a case the pressure which is employed in forcing the hot liquid mixture through the spray device will have to be high enough to cause the small droplets which are formed to travel through the air for a distance sufficient to allow the droplets to solidify substantially before they fall to the floor of the room. In most cases it is preferred either that the spray device be placed so that the droplets will have a free fall from the nozzle of the spray device to the floor of the room of from about 15 to 20 feet or more or that sufficient pressure be employed in the spray device to force the droplets through the air for a similar distance before they fall to the floor of the room. In most cases a pressure of about 10 pounds per square inch is satisfactory when the droplets are allowed to cool by a free fall through the air. Pressures of from about 5 to about 100 pounds per square inch may be used, however, if desired. When the spray device is located on or near the floor of the room and the hot liquid mixture is sprayed out in a direction roughly parallel to the floor of the room, it is usually desirable to employ a pressure of at least about 15 pounds per square inch in the spray device in order to insure that the individual droplets will pass through the air for a distance sufficient to allow them to solidify substantially before they fall to the floor of the room. The perforations in the centrifugal apparatus and the openings in the spray device are designed or adjusted so as to give solid spheroidal particles having a diameter such that the majority of the particles will pass through a 10 mesh screen but will not pass through a 100 mesh screen. In the centrifugal type devices, perforations in the sides of the vessels having a diameter of from about 1/16 to about 1/32 of an inch will ordinarily give satisfactory products. The size of the openings in the spray type devices will depend somewhat upon the amount of pressure being used to force the melted mixtures through the devices. Such devices can be readily adjusted in every case, however, to give spheroidal particles of the desired size.

In nearly all cases, the spheroidal particles which are obtained will be free flowing and will not tend to adhere to each other by any appreciable extent. If it is found that the spheroidal particles do have a tendency to adhere somewhat to each other, such tendency may be readily overcome merely by dusting these particles with a very small amount of a vegetable flour such as one of the vegetable flours used in preparing the preferred compositions of our invention.

With the products of our invention, it is possible to use fat-soluble vitamin-containing materials which have a potency substantially lower than the potency of the fat-soluble vitamin-containing materials which must be used with products such as those prepared in U. S. Patent No. 2,401,293. If desired, of course, one may use highly potent fat-soluble vitamin concentrates in preparing the products of our invention, and if it is desired to obtain dry carriers having a very high potency, it is preferred to employ highly potent fat-soluble vitamin concentrates in preparing such carriers. When highly potent fat-soluble vitamin concentrates are employed in preparing the products of our invention, it is highly preferred to incorporate a vegetable flour into the products so as to aid in maintaining the stability of the fat-soluble vitamins. In preparing dry carriers which are to be added to stock and poultry feed to enrich the fat-soluble vitamin content thereof, it is not necessary to use highly potent fat-soluble vitamin concentrates, but instead fat-soluble vitamin-containing oils having a low vitamin potency may be used. Many stock and poultry feeds are fortified with vitamin A so that they will have a potency of approximately 5 units of vitamin A per gram. To prepare dry carriers suitable for fortifying feeds to such an extent, we can use fat-soluble vitamin-containing oils having a rather low potency, inasmuch as dry carriers prepared for such use need not have a potency in excess of about 1000 or 2000 units of vitamin A per gram. As a source of the fat-soluble vitamins, we may use any of the natural or artificially produced vitamins A and D. We may use activated sterols such as irradiated ergosterol or irradiated 7-dehydrocholesterol, vitamin A in ester or alcohol forms, vitamin A which has been produced by synthetic methods, fish oils, fish liver oils, vitamin concentrates prepared from such oils, etc. Also, instead of using vitamin A in our products we may use precursors of vitamin A such as carotene. The amount of fat-soluble vitamin material in the compositions of our invention may vary from any desired minimum amount up to as much as about 60% of the total weight of the compositions. The fat-soluble vitamin material employed in the production of the compositions of this invention is such material which when mixed with an appropriate amount of said wax-like material and the mixture is heated above the melting point of the wax-like material, the mass at that temperature will be liquid; and when such mass is cooled to room temperature it will be substantially solid and uniform throughout and in the form of which in general may be termed a substantially solid solution. In most cases we prefer that the products of our invention which are carriers for vitamin A have a potency of at least about 1000 units of vitamin A per gram and that the products of our invention which are carriers for vitamin D have a potency of at least about 100 units of vitamin D per gram.

The normally solid wax-like materials which are used in preparing the products of the invention can be selected from glycerides and other fatty acid esters, fatty acids, vegetable waxes, or petroleum waxes or mixtures of such materials which have a melting point of about 45° C. or above. Among such materials are hydrogenated fats and oils such as coconut oil, cottonseed oil, peanut oil, soybean oil and fish oils, fatty acids such as stearic acid, mineral waxes such as the various petroleum waxes, vegetable waxes such as carnauba wax, candelilla wax, esparto wax, ouricury wax, etc. The hydrogenated fats and oils which are preferably employed are those having very low iodine values, that is, below 10 and for certain purposes approximately zero. In all cases, the melting point of the wax-like material used is at least about 45° C. For certain uses of the novel compositions of this invention, the wax-like materials having high minimum melting points such as 60° C. and 70° C. are employed. Consequently, in one of the embodiments of the invention, the melting point of the wax-like material is at least 45° C., while in two other embodiments, it is at least 60° C. and at least 70° C., respectively. The percentage of the normally solid wax-like material present in the compositions of this invention may be in the range of 10–75% depending upon the specific characteristics and proportions of the other components therein. For chiefly commercial purposes, however, the percentage of the normally solid wax-like material in the compositions of this invention is in the range of 15–17% by weight.

Among the antioxidants which may be incorporated into the products of our invention, there may be mentioned compounds such as propyl gallate, butylated hydroxy anisole, gallic acid, nordihydroguaiaretic acid, etc. These compounds are all edible antioxidants. Also, one can use other edible antioxidants such as vitamin E, mixed tocopherols and natural antioxidants of the types described and claimed in the U. S. Patents No. 2,345,576, No. 2,345,578, No. 2,433,593 and No. 2,434,790, natural antioxidants produced by the processes described and claimed in the U. S. Patents No. 2,396,680 and No. 2,396,681 as well as any similar edible antioxidants. In fact any edible antioxidant can be employed if desired. Also, one can use mixtures of any of these antioxidants, or one can use mixtures of one or more of these various antioxidants with a compound or compounds having little or no antioxidant effect in themselves but which when admixed with any of the antioxidants exert a synergistic effect thereon. Such compounds, which are often referred to as "synergists," are lecithin, citric acid, alkyl phosphates, etc. As far as the amount of antioxidant which is to be incorporated into the products of our invention is concerned, it is preferred to use at least about 0.05% of antioxidant in most cases but, of course, the amount of antioxidant which is used will depend to some extent upon how effective the antioxidant is. In most cases, the amount of antioxidant which is used will make up from about 0.05% to about 1.0% of the compositions of the invention. When referring to the antioxidants as "edible" we mean that they may be eaten in the quantities in which they are used as antioxidants by either humans or animals without any deleterious effects resulting therefrom. The antioxidant employed in the production of the compositions of this invention is such that when mixed with appropriate amounts of said wax-like material and said fat-soluble vitamin material, and the mixture is heated above the melting point of the wax-like material, the mass at that temperature will be liquid; and when such mass is cooled to room temperature it will be substantially solid and uniform throughout and in the form of what in general may be termed a solid solution.

The inclusion of an edible surface-active material in the compositions of our invention greatly increases the ease of digestibility of the dry carriers. We have found that the vitamins in the dry carrier products of our copending application Serial No. 291,796, filed June 4, 1952, are 100% biologically available to baby chicks and other poultry. However, we have found that rats are not always able to complete utilize the vitamin A contained in some of the products of that invention. All of the vitamins contained in the products of the present invention, however, are 100% biologically available to rats as well as to chickens. The significant difference between the compositions of the present invention and those of application Serial No. 291,796 is that the products of the present invention contain an edible surface-active agent. It is usually considered that the results of nutritional tests made on rats are an indication of the results which would be obtained if similar tests were carried out on other four-footed animals or on man. It is evident therefore that the products of the present invention are eminently suited for fortifying foods and feeds both for man and for four-footed animals with the various fat-soluble vitamins. Thus the products of the present invention are very useful for increasing the vitamin potency of foods such as canned meats, breakfast foods, etc., beverages such as cocoa, animal foods such as dog and cat foods, etc., as well as for increasing the vitamin potency of stock and poultry feeds. The products of the present invention contain from about 0.5% to about 40% of an edible surface-active agent and such agent can be selected from a large group of such compounds among which may be mentioned fatty acid esters of sorbitans and mannitans, polyethylene oxide condensation products of fatty acid esters of sorbitans and mannitans, fatty acid esters of polyethylene glycols, lecithin, gums, etc. In fact any edible surface-active material may be employed, if desired. When referring to the surface-active agents as "edible," we mean that these materials may be eaten by either humans or animals in the amounts in which they are employed in the products of the invention without any deleterious effects resulting therefrom. Among the many edible surface-active agents which can be employed in preparing the products of our invention are fatty acid esters prepared from polyethylene glycols having a molecular weight of from about 200 to about 4000 and fatty acids containing from 8 to 22 carbon atoms such as caprylic acid, capric acid, lauric acid, myristic acid, palmitic acid, oleic acid, ricinoleic acid, stearic acid, hydroxy stearic acid, arachidic acid, behenic acid, mixtures of such acids, etc.; fatty acid esters prepared from sorbitans or mannitans and any of the fatty acids containing from 8 to 22 carbon atoms such as the fatty acids listed above; polyethylene oxide condensation products of the fatty acid esters of sorbitans or mannitans, said condensation products containing from about 5 to 90 ethylene oxide units per molecule; phosphatides such as lecithin; natural gums such as gum acacia and gum tragacanth; etc.

The amount of vegetable flour which is incorporated into the preferred compositions of our invention can vary, of course, but in no case should it exceed about 50° of the final product and preferably it should not make up more than about 35% of the final product. In order to obtain the maximum benefits from the inclusion of the vegetable flour in our novel products, the vegetable flour should make up at least about 5% of the final products. The flour which is incorporated into the composition aids a great deal in maintaining the stability of the vitamins in the compositions. It is not known just how the flour aids in maintaining the stability of the vitamins, but we have found that the flour does have such an effect. The vegetable flour also aids in making the vitamins in the products more readily available to the animal or human which eats the feed or food which is enriched with these products. It seems that the vegetable flour tends to absorb moisture and thus when the products of our invention pass into the stomach of an animal or man the vegetable material will absorb water from the digestive juices in the stomach and in so doing the vegetable material will, of course, expand and as it expands it will tend to rupture and break up the spheroidal particles which make up the dry vitamin carriers. When these spheroidal particles are broken up, the vitamins therein become much more readily available for absorption from the digestive tract into the blood stream. The vegetable flour aids in another manner in making the vitamins more readily available for absorption from the digestive tract since the particles of vegetable flour are very readily digestible and as they are acted upon by the digestive juices in the stomach and intestine they tend to leave the spheroidal particles of the vitamin carrier in more or less of a honeycombed condition thus causing a much greater surface area of the dry carrier to be exposed to the action of the digestive juices. This, of course, makes the vitamins in the dry carriers much more readily available to the digestive tract.

Among the many vegetable flours which can be employed in preparing the preferred compositions of our invention are finely ground soybean meal, corn germ meal, cottonseed meal, linseed meal, wheat germ meal, corn meal, alfalfa leaf meal, wheat bran, oat meal, peanut meal, bolted rice polish, wheat flour, etc. The vegetable flour consists of rather finely divided particles of the vegetable material, the majority of which will pass through a 60 mesh screen, and in most cases it is preferred that practically all will pass through a 60 mesh screen and the majority of the particles be of a size that they will pass through a 100 mesh screen.

It has not been definitely determined just why the products of our invention are far more stable than any of the products known in the prior art. The composition of our products is somewhat similar to some of the prior art products insofar as the nature of the ingredients used therein is concerned, as is readily apparent from a comparison of the ingredients of our products with the ingredients of some of the products of the prior art discussed hereinabove. However, our products are signally different from the prior art products in that the ingredients are intimately combined with each other in a truly novel relationship whereby the availability or digestibility and also the stability of the fat-soluble vitamin content thereof are established for substantially all practical commercial purposes. It has been definitely established that the products of our invention have a far greater degree of stability than any of the products previously known in the prior art, and our products are the only ones we have found which when admixed with stock or poultry feeds will substantially retain their original vitamin potency for periods of time of from six months to a year or longer. The fact that our products are formed into a very great number of very small spheroidal particles coupled with the general method for producing them probably has a great deal to do with their outstandingly superior stability. The compositions of the prior art are formed either by grinding or otherwise comminuting large sized masses of the prior art products. Such subdivision of these prior art products gives particles having a much larger surface area per unit weight than is the case with our products; however, we do not believe that the outstanding superiority of our products can be attributed entirely to their physical form although we have found that the spheroidal shape of the individual particles which make up our products does appear to contribute significantly to the stability of the products. For one thing it may be that in the formation of the individual spheroidal particles, more or less of a case-hardening effect is obtained due to the more rapid rate of cooling of the outer surface of each particle as compared to the rate of cooling of the inner portions of each particle, and it may be that such a case-hardening effect makes the surface of the individual spheroidal particles far more resistant to penetration by oxidizing influences than would otherwise be the case. Just exactly why our products are so much more stable than the prior art products has not yet been definitely determined, and therefore we do not wish to be bound by any particular theories as to what is the actual reason or reasons for their highly superior stability.

Accordingly, this invention may be practiced by intimately combining (a) one or a combination of two or more of said wax-like materials, (b) one or a combination of two or more of said fat-soluble vitamin A and/or D-containing materials preferably in the liquid state, (c) one or a combination of two or more of said surface-active agents, and (d) one or a combination of two or more of said antioxidants. Said substances (a), (b), (c) and (d) are so proportioned that (c) is present in amount equal to 0.5–40% by weight of the total mass, and (a) is present in amount equal to 15–70% by weight of the total mass. In the preferred embodiment of our invention there is also incorporated into the compositions a component (e) which is one or more of said vegetable flours. In that preferred embodiment of our invention said components (a), (b), (c), (d) and (e) are so proportioned that (e) is present in an amount equal to 5–50% by weight of the total mass, (c) is present in an amount equal to 0.5–40% by weight of the total mass, and (a) is present in an amount equal to 15–70% by weight of the total mass. Such intimate combinations of said components in the aforesaid proportions must all be in the fluid state when a mass thereof is at elevated temperature slightly above the melting point of the wax-like material. While at elevated temperature, said mass in the fluid state may, by any appropriate means such as a stirrer or other device, be agitated or mixed to distribute substantially uniformly the separate components with respect to the others and thus obtain the intimate admixture desired. While at elevated temperature and while said components are so uniformly distributed, the mass in the fluid state is converted or formed into droplets or globules whose temperature is reduced to convert them from the fluid or liquid state to the substantially solid state whereby the solid particles so produced are substantially all passable through a 10 mesh screen and are in most part retainable on a 100 mesh screen. These solid particles are essentially spheroidal particles resembling very small wax-like beads in appearance, with (a), (b), (c) and (d) being in what in general may be termed solid solution as a continuous phase or matrix. In the preferred embodiment of the invention, there will be a large number of individual particles of component (e), i. e. a vegetable flour, substantially uniformly suspended as discrete particles in each individual spheroidal particle of the solid solution of components (a), (b), (c) and (d). One of the specific procedures which has been employed to provide such combinations of (a), (b), (c), (d) and, when present, (e) in the fluid state is to first charge the required amount of (a) into a vessel which is heated to or slightly above the melting point of (a) to convert it from its normally solid state to the liquid state and then charging into said (a) in the liquid state a previously prepared mass of (b), (c), (d) and, when present, (e) in the proportions heretofore set forth and which mass is at about the same temperature as (a) in said vessel. If desired, the ingredients may be combined in any other convenient order. This resultant mass is thoroughly mixed at said elevated temperature and is now at said temperature ready for conversion into droplets or globules by means of either centrifugal means or pressure spraying or any other convenient apparatus for that purpose. Said resultant mass, which is substantially uniform throughout and at said elevated temperature, is formed into globules or droplets; and the temperature of said globules or droplets is reduced to convert them from the fluid to the substantially solid state.

For a fuller understanding of the nature and objects of the invention, reference may be had to the following examples which are given merely as further illustrations of the invention and are not to be construed in a limiting sense. All vitamin potencies are expressed in U. S. P. units unless otherwise specified.

*Example I*

A very stable dry carrier for vitamin A in which the vitamin A was completely biologically available was prepared by melting 18.05 parts of esparto wax having a melting point of about 70-75° C. and 8.02 parts of hydrogenated fish oil having a melting point of about 65° C., and heating the melted mass to about 80° C. and then admixing therewith 5.42 parts of vitamin A concentrate, 9.71 parts of polyoxyethylene sorbitan monopalmitate, 17.6 parts of wheat germ flour, and 0.36 part of butylated hydoxy anisole along with 0.89 part of soybean lecithin to serve as synergist therefor, all of which had been preheated to a temperature of about 80° C.; and then placing the hot liquid mixture which was obtained into a rapidly rotating (about 1500 R. P. M.) cylindrical vessel which had holes in the sides thereof of a diameter of from about 1/16 to about 1/32 of an inch and allowing the liquid mixture to flow out through these holes. As the individual droplets of the liquid mixture passed through the air they rapidly solidified to form a multiplicity of small solid spheroidal particles. These particles had a very slight tendency to adhere to one another and therefore they were dusted with a small amount of wheat germ flour using one part of wheat germ flour for each 20 parts of the solid spheroidal particles. The particles were assayed for their vitamin A content and they were found to contain 93,000 units of vitamin A per gram. The stability of the vitamin A in the product was then determined by an accelerated storage test. The product was stored at 45° C. in contact with the atmosphere for three weeks, and it was then assayed for vitamin A content and found to contain 85,500 units of vitamin A per gram. The fact that only 8% of the vitamin A was destroyed under these very drastic conditions shows quite definitely that the novel products very effectively protected the vitamin A therein from oxidative destruction.

*Example II*

Another excellent dry carrier for fat-soluble vitamins was prepared in the same manner as in Example I. In the present example, 50 parts of esparto wax were heated to a temperature of about 80° C. and then 11.17 parts of a vitamin A concentrate admixed with 3.8 parts of sesame oil, 20 parts of polyoxyethylene sorbitan monopalmitate, 46.8 parts of wheat germ flour, 0.85 part of mixed tocopherols, and 0.17 part of an edible antioxidant of the type employed in Example I along with 1.7 parts of soybean lecithin to serve as a synergist for the tocopherols and the other edible antioxidant, all of which had been preheated to a temperature of about 80° C., were admixed therewith. The hot liquid mixture was then passed through a centrifugal apparatus of the type employed in Example I. The small spheroidal particles which were obtained were dusted with a small amount of wheat germ flour to prevent the particles from adhering to one another. In order to check the biological availability of the vitamin A in the products, a suspension of the products in a 3% aqueous methyl cellulose solution was prepared and this aqueous suspension was fed by stomach tube to rats. Determinations of the amount of vitamin A stored in the livers of these rats were then made and it was found that the amount of vitamin A stored was 103% of the amount of vitamin A stored when an equivalent amount of vitamin A acetate was fed to rats in the same manner but in oil dilution. These results are much superior to the results of biological availability tests of the same type with rats made on the products of our copending application, Serial No. 291,796, filed June 4, 1952, which products do not contain a surface-active material. Thus when a similar biological availability test was carried out on a product of our copending application, which product differed from the product of the present example principally in that it did not contain a surface-active material, the amount of vitamin A stored was only 34% of the amount stored when an equivalent amount of vitamin A acetate in oil was fed. There is no particular difference, however, in the biological availability to chickens of the vitamins in the products of the present application as compared to the vitamins in the products of our copending application Serial No. 291,796, filed June 4, 1952, when such products are fed mixed with the diet. In both types of products the vitamins are 100% biologically available to chickens.

*Example III*

Another product of the invention was prepared in the same manner as in the previous examples employing 30 parts of microcrystalline wax having a melting point of about 88-90° C. (sold by the Bareco Oil Company under the trade name of "Be Square Amber Wax"), 30 parts of fish liver oil, 3.75 parts of polyoxyethylene sorbitan monopalmitate, 20 parts of wheat germ flour, and 0.638 part of an edible antioxidant of the type employed in Example I along with 1.59 parts of soybean lecithin to serve as a synergist therefor. The small solid spheroidal particles which were obtained were admixed with expeller soybean meal employing a ratio of 86 parts of the spheroidal particles to 65 parts of expeller soybean meal. The resulting product had an initial assay of 2200 units of vitamin A per gram. After being stored for six months at 30° C. in contact with the atmosphere, the product had a potency of 2100 units of vitamin A per gram. Thus it is seen that less than 5% of the vitamin A in the product was destroyed during the long storage period. While this storage test was being conducted, another storage test was carried out on a mixture made up of 5 gms. of the mixture of the spheroidal particles and the expeller soybean meal and 95 gms. of a mineral mixture made up of 40 parts of ground limestone, 40 parts of steamed bone meal and 15 parts of salt. All three of the components of this mineral mixture normally tend to accelerate the oxidative destruction of vitamin A. The mixture which was produced contained 110 units of vitamin A per gram. It was stored for three months at 37° C. in contact with the atmosphere at the end of which time an assay showed that it still contained 107 units of vitamin A per gram. In still another stability test of the dry carrier, 5 gms. of the original mixture of soybean meal and the solid spheroidal particles were admixed with 95 parts of a standard stock feed giving a mixture containing a calculated potency of 110 units per gram. After two months storage at 37° C. this mixture assayed 118 units of vitamin A per gram. Thus it is clearly apparent that the product of the present example very effectively protected the vitamins from oxidative destruction.

*Example IV*

In the present example a dry carrier for fat-soluble vitamins was prepared employing hydrogenated castor oil as the normally solid wax-like material. The product was prepared in the same manner as in the previous examples, employing 33.7 parts of hydrogenated castor oil, 6 parts of vitamin A concentrate, 11.12 parts of fish liver oil, 10.5 parts of polyoxyethylene sorbitan monopalmitate, 21.33 parts of wheat germ flour, 0.553 part of mixed tocopherols, and 0.11 part of an edible antioxidant of the type employed in Example I along with 1.383 parts of soybean lecithin as a synergist for the antioxidants. The solid spheroidal particles were dusted with one part of wheat germ flour for each 20 parts of the particles and the product then assayed for vitamin A. It was found to contain 87,800 units of vitamin A per gram. After being stored for 13 days at 45° C. in contact with the atmosphere, the product had a potency of 80,200 units of vitamin A per gram. This was a very small loss of potency considering the severe storage conditions which were employed.

*Example V*

Another excellent dry carrier for fat-soluble vitamins was prepared from 15 parts of microcrystalline wax, 20 parts of fish liver oil, 6 parts of wheat germ flour, 7.3 parts of gum acacia, 1.75 parts of polyoxyethylene sorbitan mono-oleate and 0.088 part of an edible antioxidant of the type employed in Example I along with 0.22 part of soybean lecithin as a synergist therefor. In this product the gum acacia and the polyoxyethylene sorbitan mono-oleate served as the surface active material. The product was prepared in a centrifugal type apparatus in the same manner as in the previous examples. It had the same excellent stability and the same excellent biological availability of the vitamins as the products of the other examples.

*Example VI*

In this example an ester prepared from castor oil fatty acids and a polyethylene glycol having a molecular weight of about 600 was used as the surface active material. The dry carrier for the fat-soluble vitamins was prepared from 15 parts of microcrystalline wax, 20 parts of fish liver oil, 13.3 parts of wheat germ flour, 1.75 parts of the polyethylene glycol ester, and 0.09 part of an edible antioxidant of the type employed in Example I along with 0.22 part of soybean lecithin as a synergist therefor. The product was prepared in the same manner as the products of the previous examples and the vitamins therein had the same excellent stability and biological availability as in the products of the other examples.

*Example VII*

In this example soybean lecithin was employed not only as a synergist for the edible antioxidant but was also used as the surface active material. The dry carrier for the fat-soluble vitamins was prepared from 15 parts of microcrystalline wax, 20 parts of fish liver oil, 13.3 parts of wheat germ flour, 0.09 part of an edible antioxidant of the type employed in Example I and 5.22 parts of soybean lecithin which was sufficient to serve not only as a synergist for the antioxidant but also was sufficient to give the product the desired complete biological availability. The product was prepared as in the previous examples and it had the same excellent resistance to oxidative destruction of the vitamins and the same excellent biological availability of the vitamins as the products of the other examples.

*Example VIII*

In this example an excellent dry carrier for fat-soluble vitamins was prepared as in the previous examples employing 30 parts of esparto wax, 30 parts of fish liver oil, 20 parts of wheat germ flour, 3.75 parts of polyoxyethylene sorbitan monopalmitate, and 0.638 part of an edible antioxidant of the type used in Example I along with 1.59 parts of soybean lecithin to serve as a synergist therefor. This product after being formed into a multiplicity of small spheroidal particles was admixed with expeller soybean meal using a ratio of 86 parts of the spheroidal particles to each 65 parts of soybean meal. Five parts of that mixture were then mixed with 95 parts of the same type of mineral mixture employed in Example III giving a product having a calculated potency of 110 units of vitamin A per gram. This mixture was then stored at 37° C. in contact with the atmosphere for 1½ months. An assay of the product at the end of that time showed that it contained 119 units of vitamin A per gram. It was clearly apparent, therefore, that the dry carrier contained the vitamin A in a form highly resistant to oxidative destruction.

*Example IX*

In the present example a fat-soluble vitamin-containing dry carrier was prepared from 6 parts of vitamin A concentrate, 11.12 parts of fish liver oil, 10.5 parts of polyoxyethylene sorbitan monopalmitate, 33.7 parts of hydrogenated castor oil, 21.3 parts of wheat germ flour, 0.11 part of an edible antioxidant of the type employed in Example I and 0.55 part of mixed tocopherols along with 1.38 parts of soybean lecithin to serve as a synergist for the antioxidants. The mixture was formed into a multiplicity of small solid spheroidal particles by the same procedure and in the same type of apparatus as employed in the previous examples. After dusting the particles with one part of wheat germ flour for each 20 parts of the particles, the solid spheroidal particles were assayed and found to contain 87,400 units of vitamin A per gram. The products were then subjected to a severe storage test by storing them at 45° C. in contact with the atmosphere for 13 days. At the end of that time the vitamin A potency was 80,200 units of vitamin A per gram, thus showing that only about 8% of the vitamin A had been destroyed by the very severe storage conditions. It is evident that this product contained the vitamins in a form quite resistant ot oxidative destruction.

*Example X*

Another excellent dry carrier for fat-soluble vitamins was prepared as in Example I employing the same ingredients and ratios of ingredients except that the butylated hydroxy anisole of Example I was replaced with propyl gallate. The resulting dry carrier had the same excellent stability and biological availability as the product of Example I.

*Example XI*

The product of the present example was the same as that of Example X except that the edible antioxidant was gallic acid instead of propyl gallate. The product had the same excellent qualities as the products of Examples I and X.

*Example XII*

Another product was prepared as in Example X with the exception that nordihydroguaiaretic acid was employed as the edible antioxidant. This product also had the same excellent qualities as the products of Examples I and X.

*Example XIII*

In the present example a stable dry carrier for vitamin A in which the vitamin A was completely biologically available was prepared from 40 parts of esparto wax, 10 parts of vitamin A concentrate, 7.5 parts of polyoxyethylene sorbitan monopalmitate, and 0.5 part of mixed natural tocopherols along with 1.25 parts of soybean lecithin to serve as a synergist therefor. The mixture was formed into a multiplicity of small solid spheroidal particles in the same manner as in the previous examples. The product obtained had the same excellent stability as the products of the previous examples and the vitamin A therein was completely biologically available.

Example XIV

A dry carrier containing both vitamins A and D was prepared as in the previous examples by admixing 25 parts of fish liver oil, 0.58 part of vitamin $D_3$ concentrate, 25.6 parts of microcrystalline wax, 7.5 parts of polyoxyethylene sorbitan monopalmitate, and 0.51 part of butylated hydroxy anisole along with 1.27 parts of soybean lecithin as a synergist therefor. The product which was a multiplicity of small solid spheroidal particles contained the vitamins in a form highly resistant to oxidative destruction and in a form in which the vitamins were completely biologically available. The product was admixed with solvent extracted soybean flour in a ratio of 30 parts of the spheroidal particles to 28.7 parts of the soybean flour. Four parts of the mixture which was thus obtained were used to increase the vitamin potency of 96 parts of a commercial mineral and vitamin mixture ("VITA-A-GRO" manufactured by the Meyer Grain Company of Houston, Texas) which contains large amounts of several minerals having a strong tendency to cause or promote the oxidative deterioration of vitamin A. An assay of the fortified product showed a potency of 175 units of vitamin A per gram. The fortified product was then stored for three weeks at 37° C. in contact with the atmosphere. The product was then assayed again and it was found that absolutely no loss of vitamin A had occurred during the accelerated storage test.

Example XV

A dry carrier for vitamin A and vitamin D was prepared in the same manner as in the previous examples employing hydrogenated soybean oil as the normally solid wax-like material. The product was prepared from 25.6 parts of hydrogenated soybean oil, 25 parts of fish liver oil, 0.58 part of vitamin $D_3$ concentrate, 7.5 parts of polyoxyethylene sorbitan monopalmitate, and 0.51 part of an edible antioxidant of the type employed in Example I along with 1.27 parts of soybean lecithin to serve as a synergist therefor. The product had the same excellent stability and biological availability of the vitamins as the previous products.

Example XVI

Another product of the invention was prepared from 73.99 parts of a vitamin A concentrate having a potency of 844,000 units of vitamin A per gram, 262.01 parts of esparto wax, 245 parts of wheat germ flour, 3.5 parts of an edible antioxidant of the type employed in the previous examples and 80.6 parts of lecithin. The lecithin served both as a synergist for the antioxidant and as the surface active material. The product was prepared by melting the esparto wax and heating it to a few degrees above its melting point, and then admixing therewith the other ingredients all of which had been preheated to the same temperature; and thereafter passing the hot liquid mixture through a spray gun under a pressure of about ten pounds per square inch. The spray gun was pointed downwardly and the hot liquid droplets were allowed to fall about 40 feet. By the time the droplets reached the floor of the room they had solidified into a multiplicity of small solid spheroidal particles. This product had the same excellent stability and biological availability as the products of the previous examples.

Still another class of novel and highly useful compositions containing vitamin A and/or D in which the vitamin content thereof is highly stable and available or digestible may be prepared by replacing a small proportion of said wax-like material (a) with normally solid resinous ethyl cellulose capable of forming a solid solution with the combination of the wax-like material, the vitamin bearing material, the surface-active agent, and the antioxidant. For this purpose it is recommended that approximately 3–25 parts of the ethyl cellulose resin be employed per 100 parts of the wax-like material. When such a resin is employed, it may be mixed with the wax-like material and such combinations may be heated to the temperature wherein they both melt or the ethyl cellulose goes into solution in the melted wax-like material. Even more than 25% of the wax-like material may be replaced by the resin if desired. As a matter of fact, the quantity of wax-like material which may be replaced by the resin in general is between 3–100% of the weight of the wax-like material. When all of the wax-like material is replaced by ethyl cellulose, the latter must be capable of forming a solid solution with the vitamin-bearing material, the surface-active agent, and the antioxidant. It has been discovered that the presence of the resin, either in combination with the wax-like material in all various proportions, or alone, materially aids in maintaining the vitamin A potency of the finished products. In addition, the resin imparts highly desirable physical characteristics, namely hardness and excellent flow of the finished solid product.

Though the ethoxyl content and the viscosity of ethyl cellulose have a profound influence on its physical properties, it has been found that all of the commercially available forms, ranging in ethoxyl content from 44.5% to approximately 50%, and in viscosity from 6 to 250 centipoises at 25° C. for a 5% solution in appropriate organic solvents, have been found useful.

According to this aspect of the invention, ethyl cellulose resins together with one or a combination of two or more of said wax-like materials in the ratio by weight of 3–100 parts of the former to 97–0 parts of the latter may be heated together to a temperature at which solution takes place. In a separate container, a mixture made up of one or more edible antioxidants together with one or more of the fat-soluble vitamin-containing materials and one or more edible surface-active agents, and in the preferred embodiment of the invention a quantity of one or more vegetable flours, is heated to an elevated temperature. The first prepared liquid solution is now cooled to a temperature below the melting point of the resin but is maintained at a temperature slightly above that required to prevent the solution from being converted to the solid state. Then the other mixture at elevated temperature is added to said resin-wax-like material and is thoroughly mixed therewith to obtain a uniform fluid mass with all of the components, except the flour when present, being in the liquid state, and the particles of flour when present being uniformly distributed therethrough or suspended therein. When the flour is present, the proportion of flour in said liquid mass at elevated temperature may be in the range of 5–50% by weight. Subsequently this fluid mass may be converted or formed into droplets or globules in the liquid state and then the temperature thereof is reduced to convert them to the solid state. Spraying is one means of accomplishing this purpose. It is preferable that in carrying out this particular process in which the resin is employed to conduct all of the steps in an oxygen-free and inert atmosphere and also to maintain as low as possible the period the vitamin-bearing material is at elevated temperature. The resultant product produced in this manner consists essentially of a multiplicity of small spheroidal beads practically all passable through a 10 mesh screen and retainable on a 200 mesh screen, with said spheroidal particles comprising essentially (A) 15–70% by weight of a material selected from the group consisting of a wax-like material and ethyl cellulose in the proportions by weight of 0–97 parts of the former to 100–3 parts of the latter, (B) one or a combination of two or more of said vitamin-containing materials, (C) from 0.5–40% by weight of one or a combination of two or more of said surface-active agents, and (D) one or more of said edible antioxidants being present in minor proportions, with A, B, C and D being in solid solution. In the preferred form of this embodiment of the invention, vegetable flour will be dispersed as discrete particles in the solid solution of the other components in from 5–50% by weight of the product.

This application is a continuation-in-part of our co-pending application Serial No. 99,115 filed June 14, 1949, now abandoned.

Having described our invention, what we claim as new and desire to secure by Letters Patent is:

1. A highly stable fat-soluble-vitamin-containing composition of matter wherein the fat-soluble vitamin content is available biologically, said composition of matter comprising a multiplicity of small, substantially solid spheroidal particles consisting essentially of (a) normally solid wax-like material having a melting point of at least 45° C., (b) fat-soluble-vitamin-containing material selected from the group consisting of fat-soluble-vitamin-A-containing material and fat-soluble-vitamin-D-containing material, (c) an edible surface-active material, and (d) an edible antioxidant, said substances (a), (b), (c) and (d) being intimately combined with each other, said composition having been produced by forming (a), (b), (c) and (d) into a substantially uniform molten mass, thereafter forming very small fluid droplets from the molten mass and projecting the very small droplets through the air until they are substantially solidified, said spheroidal particles having (a), (b), (c) and (d) in substantially solid solution, the quantity by weight of (a) in said spheroidal particles being between about 15% and 70% of the combined weights of (a), (b), (c), and (d), and the quantity by weight of (c) being between about 0.5% and 40% of the combined weights of (a), (b), (c), and (d), and substantially all of said spheroidal particles being passable through a 10 mesh screen and being retainable on a 100 mesh screen.

2. A composition of matter defined in claim 1, wherein (a) is mineral wax.

3. A composition of matter defined in claim 1, wherein (a) is esparto wax.

4. A composition of matter defined in claim 1, wherein (a) is hydrogenated glyceride oil having an iodine value no greater than 5.

5. A composition of matter defined in claim 1, wherein (a) is natural vegetable wax.

6. A composition of matter defined in claim 1, wherein (b) is fat-soluble-vitamin-A-containing material.

7. A composition of matter defined in claim 1, wherein (c) is a polyoxyethylene sorbitan monopalmitate containing from about 5 to about 90 ethylene oxide units.

8. A composition of matter defined in claim 1, wherein (c) is lecithin.

9. A highly stable fat-soluble-vitamin-containing composition of matter wherein the fat-soluble vitamin content is available biologically, said composition of matter comprising a multiplicity of small, substantially solid spheroidal particles consisting essentially of (a) normally solid wax-like material having a melting point of at least 45° C., (b) fat-soluble-vitamin-containing material selected from the group consisting of fat-soluble-vitamin-A-containing material and fat-soluble-vitamin-D-containing material, (c) an edible surface active material, (d) an edible antioxidant and (e) a vegetable flour, said substances (a), (b), (c), (d) and (e) being intimately combined with each other, said composition having been produced by forming (a), (b), (c), (d) and (e) into a substantially uniform molten mass, thereafter forming very small fluid droplets from the molten mass and projecting the very small droplets through the air until they are substantially solidified, said spheroidal particles having (a), (b), (c) and (d) in substantially solid solution forming a continuous phase with particles of (e) suspended therein and measuring about 5% to about 50% of the combined weights of (a), (b), (c), (d) and (e), the quantity by weight of (a) in said spheroidal particles being between about 15% and 70% of the combined weights of (a), (b), (c), (d) and (e), and the quantity by weight of (c) being between about 0.5% and 40% of the combined weights of (a), (b), (c), (d) and (e), and substantially all of said spheroidal particles being passable through a 10 mesh screen and being retainable on a 100 mesh screen.

10. A composition of matter defined in claim 9, wherein (a) is mineral wax.

11. A composition of matter defined in claim 9, wherein (a) is esparto wax.

12. A composition of matter defined in claim 9, wherein (a) is hydrogenated glyceride oil having an iodine value no greater than 5.

13. A composition of matter defined in claim 9, wherein (a) is natural vegetable wax.

14. A composition of matter defined in claim 9, wherein (b) is fat-soluble-vitamin-A-containing material.

15. A composition of mattter defined in claim 9, wherein (e) is wheat germ flour.

16. A composition of matter defined in claim 9, wherein (c) is a polyoxyethylene sorbitan monopalmitate containing from about 5 to about 90 ethylene oxide units.

17. A composition of matter defined in claim 9, wherein (c) is lecithin.

18. A composition of matter defined in claim 9, wherein (c) is a fatty acid ester prepared from a polyethylene glycol having a molecular weight of from about 200 to about 4000 and a fatty acid containing from 8 to 22 carbon atoms.

References Cited in the file of this patent

UNITED STATES PATENTS

| | | |
|---|---|---|
| 1,764,085 | Placak | June 17, 1930 |
| 2,195,595 | Nitardy | Apr. 2, 1940 |
| 2,206,113 | Nitardy | July 2, 1940 |
| 2,401,293 | Buxton | June 4, 1946 |
| 2,417,299 | Freedman | Mar. 11, 1947 |
| 2,426,762 | Chanin | Sept. 2, 1947 |
| 2,496,634 | Melnick | Feb. 7, 1950 |
| 2,685,517 | Dunmire | Aug. 3, 1954 |

OTHER REFERENCES

Sandell: Pharmaceutisk Revy, vol. 45, October 12, 1946, pp. 697 to 711.

Halpern: Journal of Biological Chemistry, vol. 174, July 1948, pp. 817 to 826.

Sobel: Journal of Nutrition, February 10, 1948, pp. 225 to 238.

U. S. Dispensatory, 24th ed. (1947), page 1503.